(12) United States Patent
Lavezzi et al.

(10) Patent No.: US 7,318,313 B2
(45) Date of Patent: Jan. 15, 2008

(54) SWITCH

(75) Inventors: Roberto Lavezzi, Brembate di Sopra (IT); Tomasz Grabiec, Mozzo (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 0 days.

(21) Appl. No.: 10/543,629

(22) PCT Filed: Jan. 31, 2003

(86) PCT No.: PCT/IT03/00043

§ 371 (c)(1),
(2), (4) Date: Feb. 2, 2006

(87) PCT Pub. No.: WO2004/068520

PCT Pub. Date: Aug. 12, 2004

(65) Prior Publication Data

US 2006/0230921 A1    Oct. 19, 2006

(51) Int. Cl.
*H01H 13/18*    (2006.01)
*F15B 15/28*    (2006.01)

(52) U.S. Cl. .................. 60/534; 200/61.89; 200/82 R; 91/1

(58) Field of Classification Search ................ 60/534; 91/1; 92/5 R; 200/61.89, 82 R, 82 D
See application file for complete search history.

(56) References Cited

U.S. PATENT DOCUMENTS 3,752,271 A * 8/1973 Haraikawa ............... 60/534
4,077,217 A * 3/1978 Leiber ..................... 60/535
4,621,565 A * 11/1986 Leigh-Monstevens ..... 60/534
4,742,193 A   5/1988 Kassin et al.
5,343,005 A * 8/1994 Salzmann ............... 200/61.89
6,345,566 B1  2/2002 Stevens
7,004,059 B2 * 2/2006 Kuczera et al. ............. 92/5 R

FOREIGN PATENT DOCUMENTS

DE      43 30 917 C    2/1995
DE      4330917 C1 *   2/1995
EP      1 013 943 A    6/2000

OTHER PUBLICATIONS

International Search Report dated Oct. 23, 2003 for International Application No. PCT/IT03/00043.

* cited by examiner

*Primary Examiner*—Thomas E. Lazo
(74) *Attorney, Agent, or Firm*—Hogan & Hartson LLP

(57) ABSTRACT

A switch in particular for a master cylinder unit, for opening and/or closing an electrical circuit, for example, for switching on the brake lights, comprises a casing suitable for being housed in a compartment of the cylinder body, a first electrical contact fixed firmly to the casing, a movable element slidable in the casing, a second electrical contact associated with the movable element, and a resilient element for keeping the movable element constantly urged against the piston of the master cylinder unit.

The switch forms a switch box which is produced separately and can be associated with the cylinder body in the compartment provided therein.

68 Claims, 10 Drawing Sheets

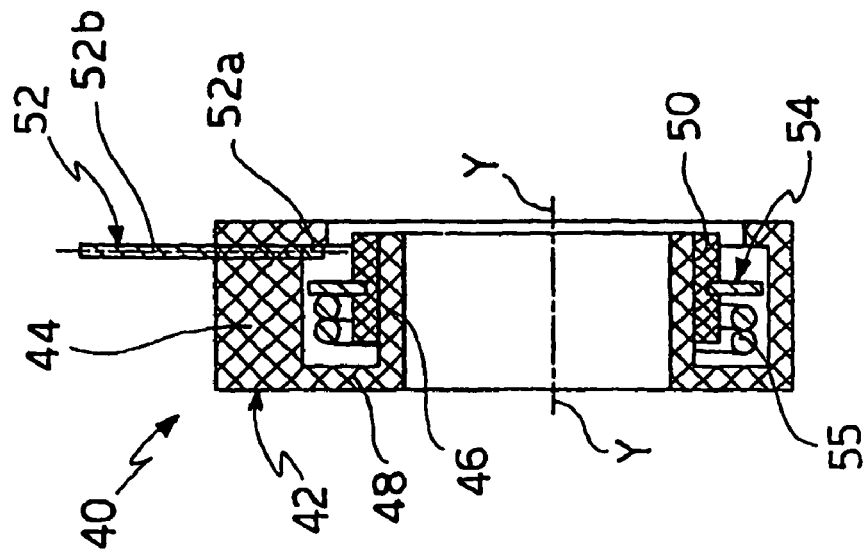
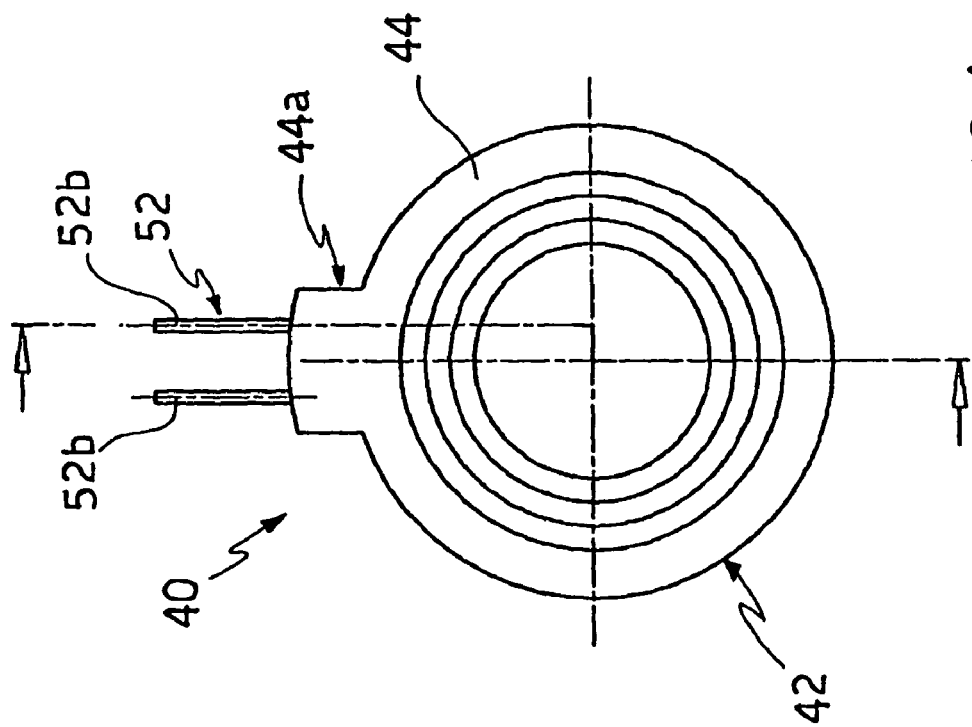

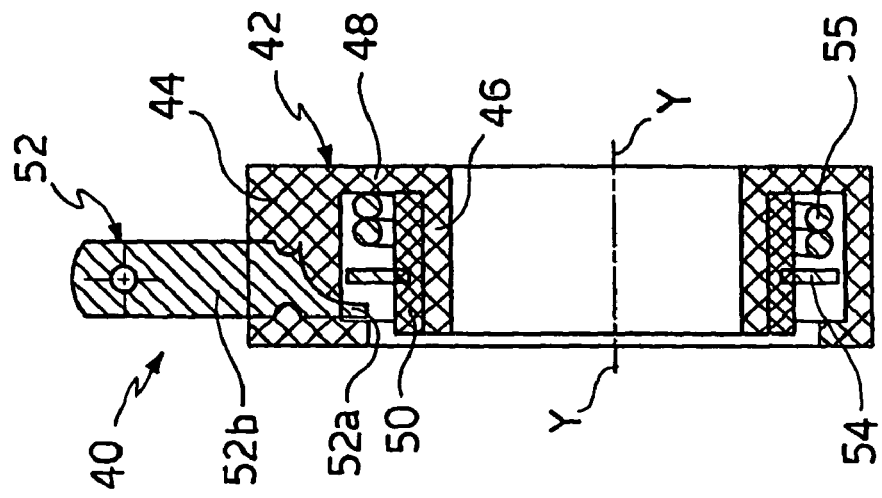
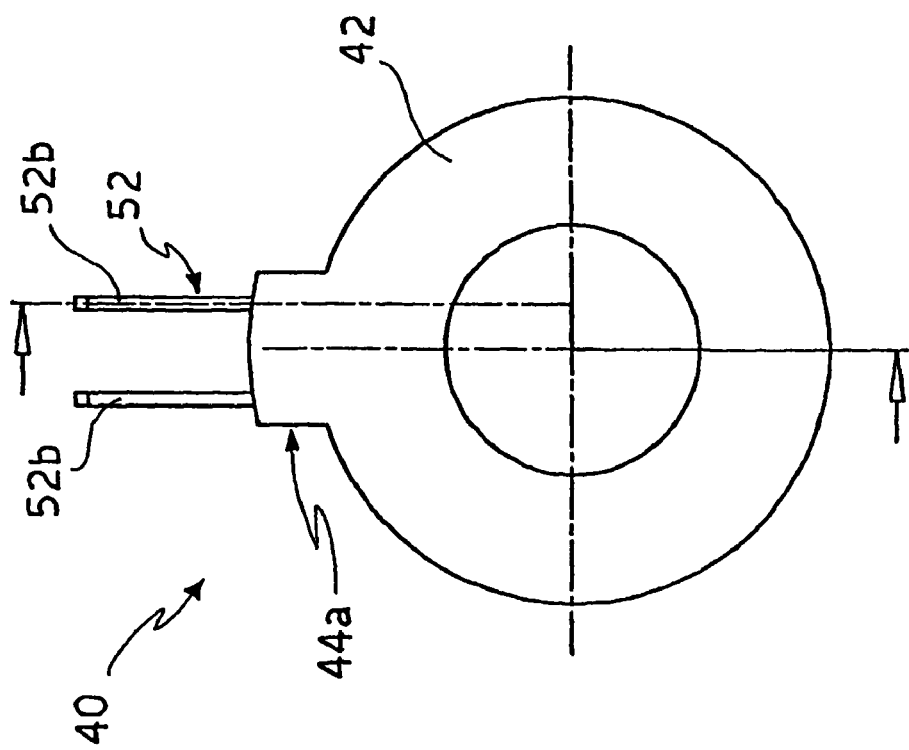

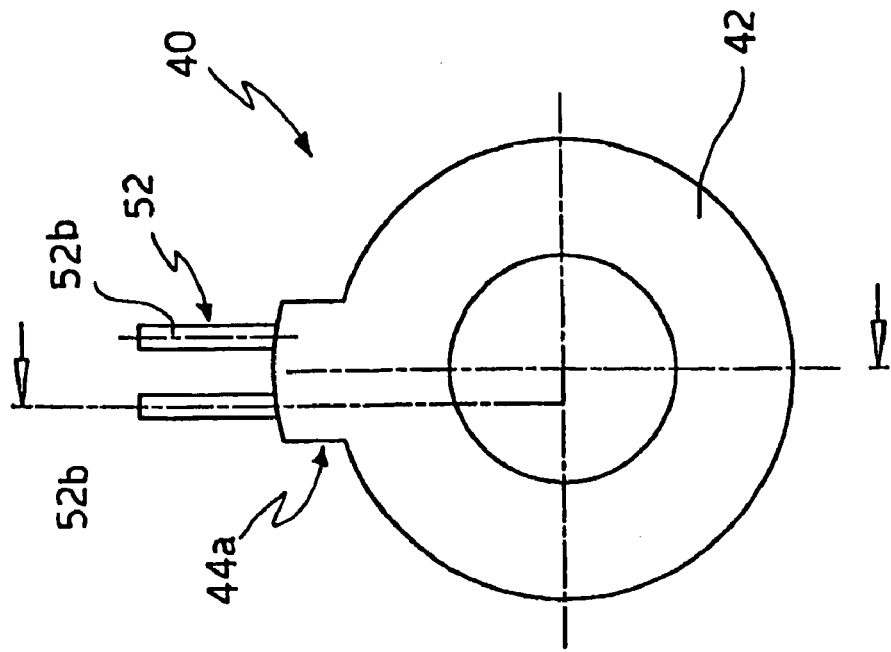
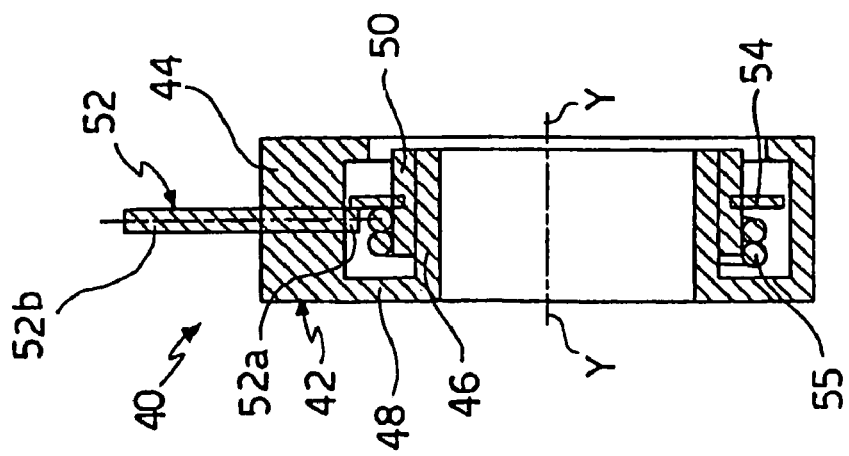
FIG. 3c
FIG. 3b

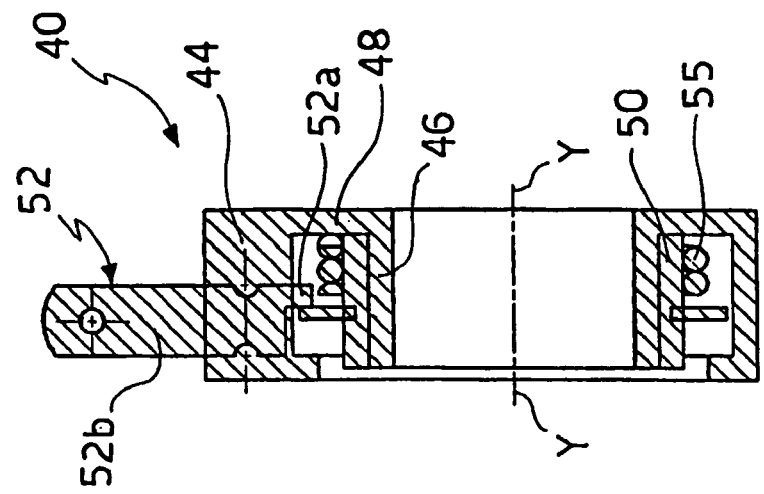
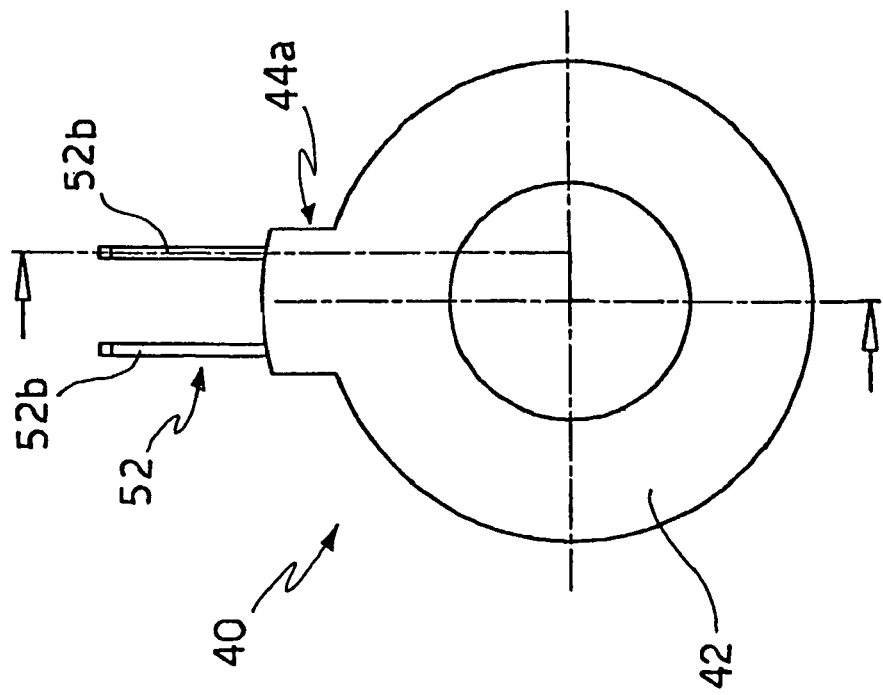
FIG.4b
FIG.4c

SWITCH

BACKGROUND OF INVENTION

The subject of the present invention is a switch which can be associated with a device and is intended to open and/or close at least one electrical circuit.

In particular, the present invention relates to a switch for a master cylinder unit, particularly a switch for a master cylinder unit that is provided with an electrical circuit for activating and/or deactivating signals, for example, indicating the execution of a braking operation, and the like.

A cylinder unit, particularly a master cylinder unit to be associated with a brake, for example, a disc brake, or with a clutch, generally incorporates an electrical circuit which is closed or opened as a result of the operation of the cylinder unit in order to activate and/or deactivate signals, for example, indicating the execution of a braking operation, or in order to activate and/or deactivate the sending of one or more electrical signals that can be used, for example, by an electronic control unit for the control of the engine, or the like.

There is a great need to provide a master cylinder unit having an electrical circuit such that the master cylinder unit is of simple construction and, in particular, inexpensive to assemble and highly reliable, in order to limit production costs but nevertheless to ensure high levels of safety for the user of the finished product.

It is known to produce a master cylinder that is provided with stationary electrical contacts housed in a cartridge which can be fitted in the cylinder body, and with sliding contacts incorporated in the piston structure.

An arrangement such as that referred to is described, for example, in U.S. Pat. No. 6,345,566.

However, constructional solutions of the type mentioned require particular care for the correct assembly of the components; in fact it is necessary to mount and fix the stationary electrical-contact cartridge on the cylinder body and to mount and fix the sliding contacts on the piston structure.

SUMMARY OF INVENTION

The problem underlying the present invention is that of devising a switch, particularly for a master cylinder unit, and a master cylinder unit, which have structural and functional characteristics such as to satisfy the above-mentioned requirements and at the same time to overcome the disadvantages mentioned with reference to the prior art.

This problem is solved by a switch according to claim 1 and claim 27. The claims dependent on these claims, respectively, describe variants.

BRIEF DESCRIPTION OF DRAWINGS

Further characteristics and the advantages of the switch, of the device with which it can be associated, and of the master cylinder unit according to the present invention will become clear from the following description of a preferred and non-limiting embodiment, in which:

FIGS. 1b and 1c are a cross-section and a front view of the switch of FIG. 1a, respectively, FIGS. 2b and 2c are a cross-section and a front view of the switch of FIG. 2a, respectively, FIGS. 3b and 3c are a cross-section and a front view of the switch of FIG. 3a, respectively, FIGS. 4b and 4c are a cross-section and a front view of the switch of FIG. 4a, respectively.

DETAILED DESCRIPTION

Figure 1A:
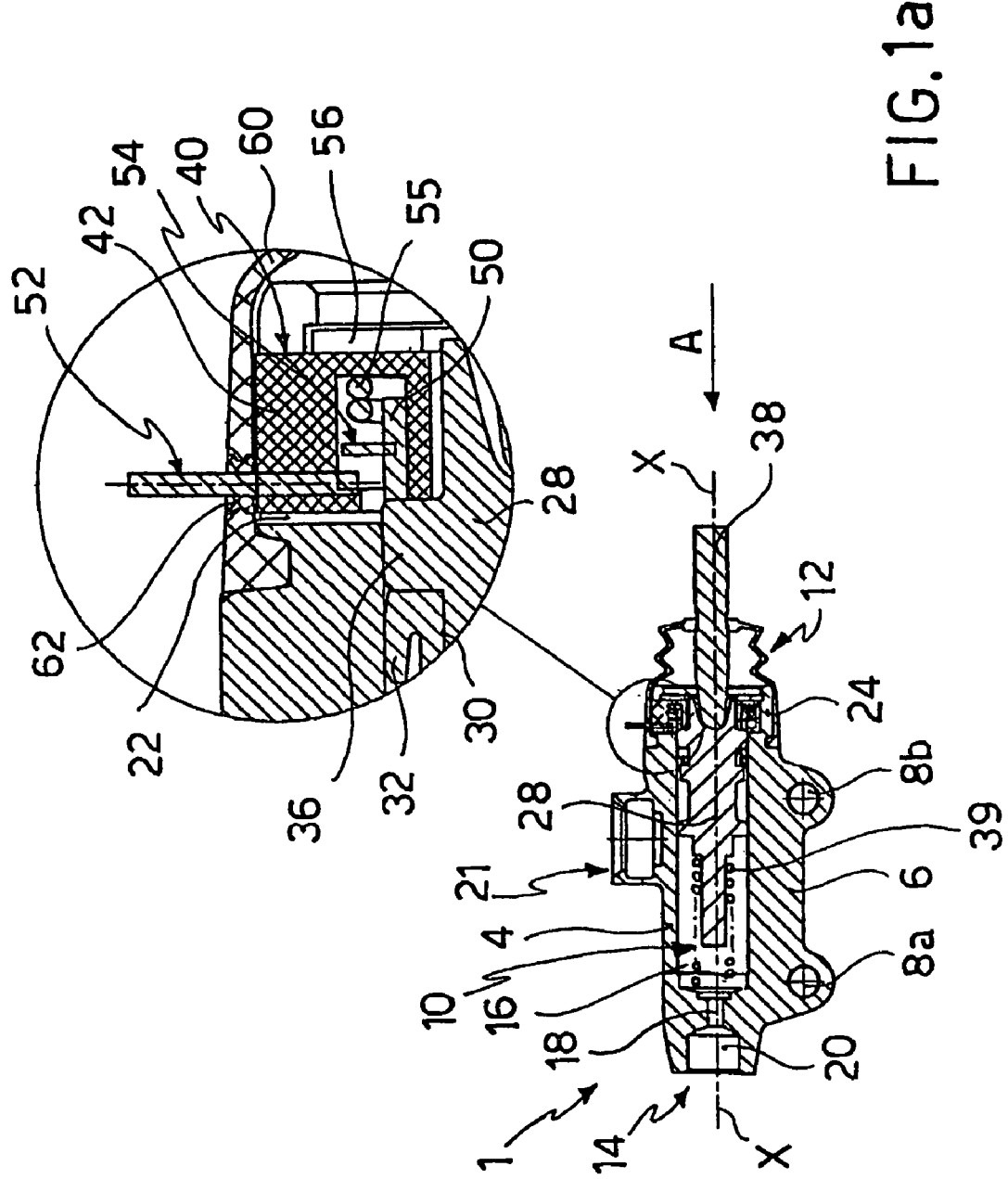
FIG. 1a is a cross-section through a master cylinder unit provided with a switch according to a first variant.

With reference to the appended drawings, a master cylinder unit according to present invention is generally indicated 1.

The cylinder unit 1 has a cylinder body 2 formed with a substantially elongate body wall 4 extending along a body-wall axis X-X.

The cylinder body 2 is preferably made of plastics material.

In a further variant, the cylinder body is made of metal, for example, light aluminium alloy.

The cylinder body 2 comprises means for connecting the cylinder body to a support structure.

In a preferred embodiment, the connecting means provide one or more connection holes, preferably formed in a projecting portion 6 of the body wall 4.

In a preferred embodiment of the cylinder body, the connecting means comprise a first connection hole 8a and a second connection hole 8b formed in the projecting portion 6 of the body wall 4.

The connection means are suitable for connecting the cylinder body 2 to a support structure.

For example, for a cylinder body that is intended for a master cylinder unit for operating a brake, in particular, a motor-vehicle rear brake, the support structure comprises elements that are connected to the chassis of the motor vehicle and are arranged in the vicinity of the footrest supporting the driver's right foot.

The cylinder body also has a substantially cylindrical cavity 10 extending along the body-wall axis X-X between a free end 12 of the cylinder body 2 and a base 14.

The cavity 10 comprises a piston seat 16 disposed between the free end 12 and the base 14. The base 14 has an output duct 18 and an output connector 20.

In a variant, the cylinder body 2 has an inlet connector 21 that is in communication with the piston seat 16 and is connected to a reservoir of the working fluid.

In the vicinity of the free end 12, the piston seat 16 has a housing compartment 22 formed by means of a radial thinning of the body wall 4 so as to define a compartment wall 24.

The compartment wall 24 has an axial notch 26 extending along the body-wall axis X-X.

The cylinder unit 1 further comprises thrust means suitable for being operated by a user in order to put the working fluid of the cylinder unit under pressure.

The thrust means comprise a piston 28 suitable for being housed slidably in the piston seat 16.

The piston 28 comprises sealing means suitable for forming a seal between the piston 28 and the piston seat 16.

In a preferred embodiment, the sealing means comprise a seal seat 30 housing a sealing ring 32 also known as a secondary seal.

In a further variant, the sealing means comprise a plurality of seal seats formed in the piston 28 and housing respective sealing rings so as to form sealing means comprising a primary seal and a secondary seal.

In a preferred embodiment, the piston 28 has a shoulder 36 which takes the form of a circumferential projection.

The shoulder 36, together with a further shoulder 36' axially spaced from the shoulder 36, preferably defines the seal seat 30 of the sealing means.

The thrust means further comprise a push-rod 38 which cooperates with the piston 28 so that, during the operation of the cylinder unit, the piston 28 slides inside the piston seat 16, putting the working fluid under pressure.

In a preferred embodiment, the push-rod 38 cooperates with the piston 28 by being partially fitted in a seat provided at one end of the piston.

The push-rod 38 can be operated by a user of the cylinder unit, for example, by means of a pedal system, as for a motor-vehicle rear brake or clutch.

The cylinder unit further comprises biasing means, which are preferably resilient and are suitable for constantly acting on the piston 28 in opposition to the action of the push-rod 38 on the piston.

The resilient biasing means comprise a spring 39.

The master cylinder 1 further comprises a switch 40 which can be associated with the cylinder unit in order to open and/or to close at least one electrical circuit.

The switch 40 comprises a casing 42 suitable for being housed in the housing compartment 22 of the cylinder body 2.

The casing 42 extends along a casing axis Y-Y in a substantially cylindrical configuration.

The casing 42 has an outer annular wall 44 and an inner annular wall 46, radially inside the outer annular wall 44, the walls being connected by a stop wall 48 substantially perpendicular to the casing axis Y-Y.

In a preferred embodiment, the casing 42 has a radial projection 44a fixed firmly to and preferably integral with the outer annular wall 44.

The outer annular wall 44 and the radial projection 44a form means for the guiding and insertion of the switch 40 in the housing compartment 22 of the cylinder body 2.

The switch 40 also comprises a substantially cylindrical movable element 50 slidable on the inner annular wall 46 of the casing 42.

The inner annular wall 46 forms guide means for the movable element 50 of the switch 40.

The movable element 50 is at least partially housed in the casing 42 of the switch 40 so that the switch 40 forms a separate switch box which can be associated with the cylinder body 2 of the cylinder unit 1.

In other words, the movable element 50 slides on the inner annular wall 46 of the casing 42, remaining at least partially inside the casing 42 which, by means of its outer annular wall 44, enables the separate switch 40 to be housed in the cylinder body 2.

In yet other words, the switch 40 is formed by a separate switch box which can be inserted in the compartment provided in the cylinder body.

The switch 40 also comprises a first electrical contact 52 which is fixed firmly to the casing 42 so as to have a first portion 52a projecting internally from the outer annular wall 44 of the casing 42 and a second portion 52b projecting externally from the outer annular wall 44.

In a preferred embodiment, the first contact 52 is incorporated in the outer annular wall 44 of the casing 42, preferably projecting from the radial projection 44a.

In one embodiment, the first electrical contact 52 takes the form of a pair of portions of wire made of electrically-conductive material, for example, of copper (FIGS. 1a to 1c, 3a to 3c, and 5).

In a further embodiment, the first electrical contact 52 takes the form of a pair of "Faston" terminals (FIGS. 2a to 2c, 4a to 4c, and 6).

The switch also comprises a second electrical contact 54 associated with the movable element 50.

The second electrical contact 54 is suitable for cooperating with the first electrical contact 52 which is fixed firmly to the casing 42, in order to open and/or to close the electrical circuit.

In a preferred embodiment, the second contact 54 is fixed firmly to the movable element 50, for example, is incorporated in the movable element 50, and has at least one portion projecting therefrom (FIGS. 1a-1c, 2a-2c, 3a-3c, 4a-4c).

The second electrical contact 54 preferably takes the form of a ring-shaped element or washer.

In a further embodiment, the first electrical contact 52 and/or the second electrical contact 54 are flexible, that is, resiliently yielding.

In particular, in this embodiment, the first electrical contact 52 is resiliently yielding in the region of the inwardly projecting first portion 52a which cooperates with the second electrical contact 54.

In a further embodiment, the second electrical contact 54 is resiliently yielding in the region of the portion which cooperates with the first electrical contact 52.

Figure 5:
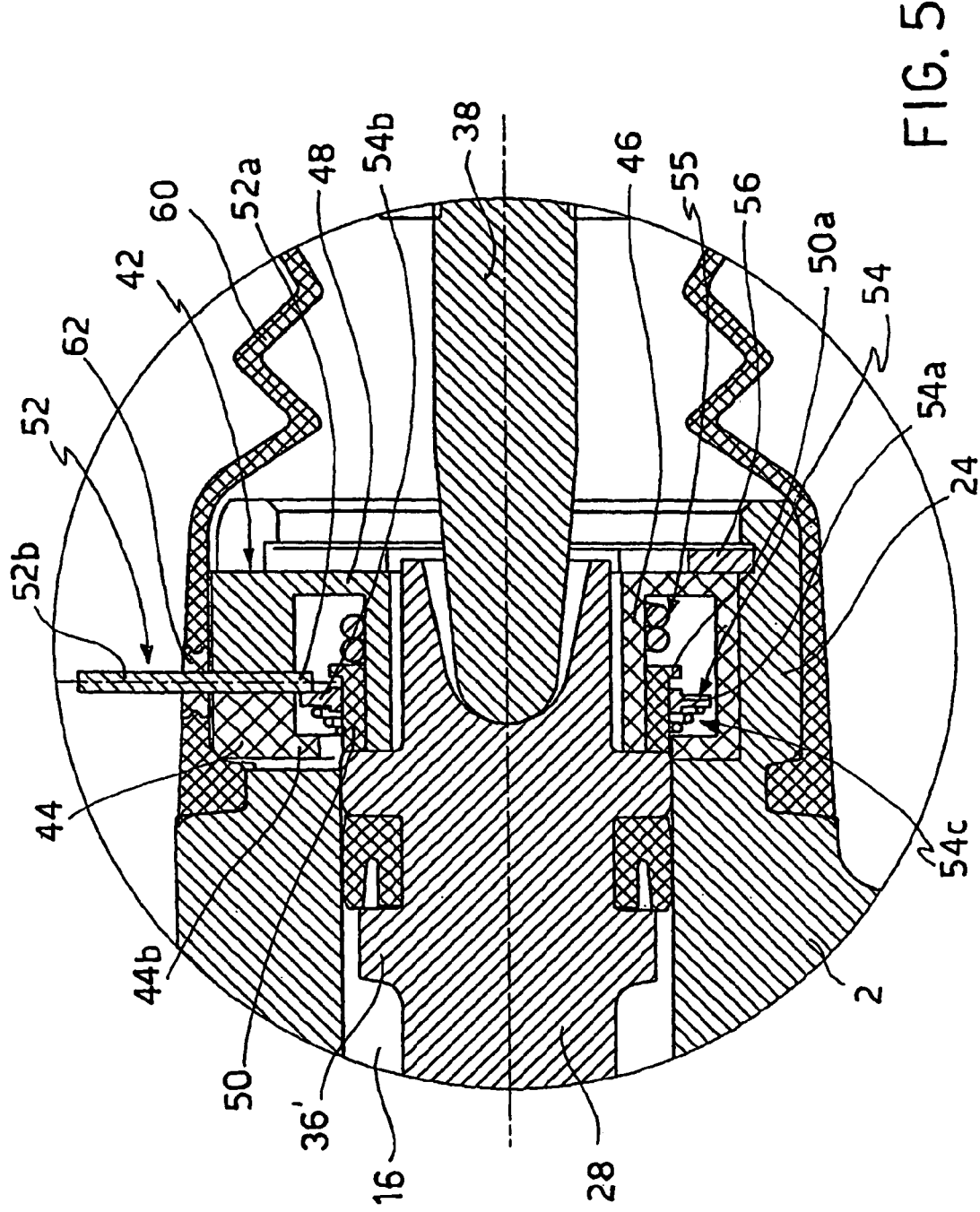
FIG. 5 shows a further embodiment of the switch according to the invention, housed in a master cylinder unit.
Figure 6:
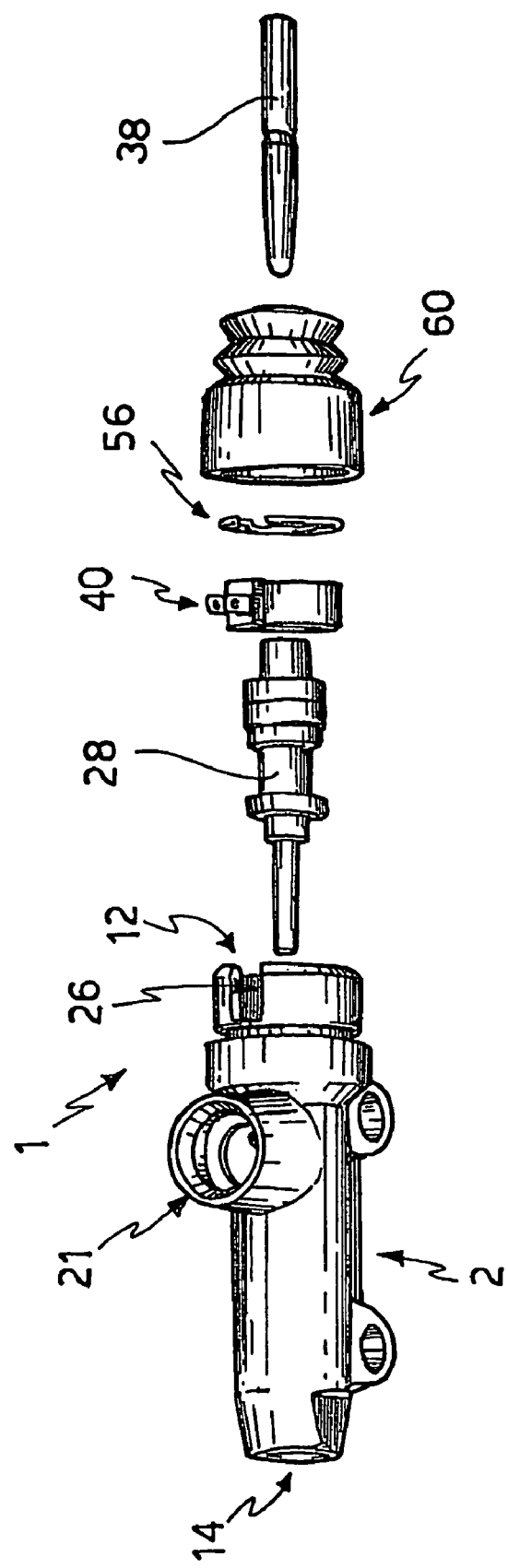
FIG. 6 is an axonometric view of a master cylinder unit according to a further variant, with parts separated.

In yet a further embodiment, the second electrical contact 54 is slidable on the movable element 50 (FIG. 5)

In this embodiment, the movable element 50 preferably has an annular retaining projection 50a projecting from the movable element 50 and suitable for preventing the second electrical contact 54, which is slidable on the movable element 50, from slipping off the movable element 50.

In this embodiment, the second electrical contact 54 comprises a tubular coupling portion 54a suitable for being fitted on the movable element 50 so as to be slidable on the movable element.

The second slidable electrical contact 54 also comprises a contact portion 54b which extends radially outwards relative to the coupling portion 54a and is preferably formed integrally therewith.

The contact portion 54b of the second electrical contact 54 is suitable for cooperating with the first electrical contact 52 in order to open and/or to close the electrical circuit.

The second electrical contact 54, which is slidable on the movable element 50, is acted on by a contact spring 54c fixed firmly to the movable element 50 by engagement means.

The engagement means comprise, for example, a coil of the contact spring 54c that is housed in a channel provided in the movable element 50, constituting a channel/ring security system, or the like.

The contact spring 54c is preferably a conical spring in which the largest-diameter coil is suitable for coming into contact with the second electrical contact 54.

In other words, in this embodiment, the second electrical contact 54 is slidable on the movable element 50 between the annular retaining projection 50a and the contact spring 54c.

The translation of the second electrical contact 54 advantageously ensures the contact between the first electrical contact 52 and the second electrical contact 54.

The switch 40 further comprises resilient means suitable for constantly acting on the movable element 50.

The resilient means preferably comprise a spring 55 suitable for being housed in the casing 42 of the switch 40, and arranged in abutment with the stop wall 48 of the casing 52.

In a preferred embodiment, the cylinder unit 1 further comprises means for fixing the switch 40 firmly to the cylinder body 2, the fixing means being suitable for uniting the switch with the cylinder body 2 in an assembled configuration of the cylinder unit 1.

The fixing means preferably comprise a split ring 56 suitable for being fitted in a ring seat provided in the housing compartment 22 of the cylinder body 2.

In a further embodiment, the cylinder unit 1 comprises a protective boot 60 suitable for being fitted on the cylinder body in the region of the free end 12 thereof.

The protective boot 60 can preferably be associated with a seat provided externally on the cylinder body, for example, an outer circumferential groove of the body wall 4, in the vicinity of the compartment wall 24.

In a preferred embodiment, the protective boot 60 has a closure element 62 provided with a through slot and suitable for being inserted in a hole in the protective boot 60.

In an assembled configuration of the master cylinder 1, the piston 28 is inserted in the piston seat 16 of the cylinder body 2 in a leaktight manner.

The resilient biasing means, in particular, the spring 39, is preferably arranged between the end of the piston 28 that is near the base 14 of the cylinder body 2 and the wall of the output duct 18 of the cylinder body 2.

The switch 40 is suitable for being housed in the housing compartment 22 of the cylinder body 2, preferably fixed firmly to the cylinder body by means of the split ring 56 housed in the seat provided in the housing compartment.

In the fitted configuration, the casing axis Y-Y of the switch 40 coincides substantially with the body wall axis X-X of the cylinder body 2.

The radial projection 44a of the outer annular wall 44 of the switch 40 is suitable for being inserted in the axial notch 26 of the cylinder body 2.

In other words, the switch 40 is associated with the cylinder body 2 in the housing compartment 22 by a form fit, whilst having a radial clearance relative to the end portion of the piston 28 that is coupled with the push-rod 38.

In yet other words, in the assembled configuration, the switch 40 is fitted on the piston 28 with clearance, the movable element 50 is kept in abutment with the shoulder 36 of the piston, the outer annular wall 44 of the casing 42 is coupled with the housing compartment 22 with a form fit, and the inner annular wall 46 of the casing 42 has a radial clearance relative to the piston 28.

The first electrical contact 52, which is fixed firmly to the casing 42 of the switch 40, has its outer portion 52b projecting from the cylinder body 2.

In a preferred embodiment, the outer portion 52b of the first electrical contact 52 extends through the protective boot 60 which is fixed firmly to the cylinder body 2.

The closure element 62 is fitted on the outer portion 52b of the first electrical contact 52 and closes the space between the boot and the outer portion.

In the assembled configuration of the cylinder unit 1, the spring 55, which is in a state of compression, constantly acts on the movable element 50, or acts constantly on the movable element 50 by acting on the second electrical contact 54 associated with the movable element 50.

The movable element 50 is in abutment with the shoulder 36 of the piston 28.

In other words, whereas the casing 42 is fixed firmly to the cylinder body 2 and stationary, the movable element 50, which is slidable in the casing 42, is urged into abutment with the shoulder 36 of the piston 28 by the spring 55 so as to follow the movement of the piston without being stuck to the piston or mechanically engaged thereon.

The shoulder 36 forms a coupling portion between the piston 28 and the movable element 50 of the switch 40.

During the normal use of the cylinder unit 1, a translation of the push-rod 38 from the free end 12 towards the base 14 of the cylinder body, which is referred to as the cylinder-operating translation, that is, in the direction indicated by the arrow A, brings about the operation of the cylinder unit 1.

As a result of this operating translation of the push-rod 38, the working fluid contained in the piston seat 16 is put under pressure by the translation of the piston 28 and, by means of a hydraulic circuit communicating with the output connector 20, activates the devices of a brake in order to bring about braking, or the devices of a clutch in order, for example, to perform a change of gear ratio, or the like.

The movable element 50 of the switch 40 follows the piston 28 in its translation, bringing about an opening and/or a closure of an electrical circuit which is intended to activate and/or deactivate signals, for example, indicating the execution of a braking operation or the like.

The translation of the movable element 50 terminates at the abutment means of the switch 40 which can stop the translation of the movable element 50 when the switch has opened and/or closed the electrical circuit.

In a preferred embodiment, the abutment means comprise the first portion 52a of the first electrical contact 52 projecting internally from the outer annular wall 44 of the casing 42 (FIG. 1a and 1b and FIGS. 2a and 2b).

In a further embodiment, the abutment means comprise a radial projection 44b projecting internally from the outer annular wall 44 of the casing 42 (FIGS. 3a and 3b, 4a and 4b, and 5).

In other words, the translation of the movable element 50 continues, following the translation of the piston 28, until the movable element strikes the abutment means, for example, until the second electrical contact 54 strikes the first portion 52a of the electrical contact 52, or until the second electrical contact 54 strikes the annular projection 44b of the casing 42.

Upon completion of the braking operation by means of a brake unit, or of the operation to change the gear ratio by means of a clutch unit, or the like, the push-rod 38 is released by the user.

The resilient biasing means, in particular, the spring 39, which is compressed during the cylinder-operating stage, that is, during the braking stage, acts on the piston 28, bringing about a translation of the piston in the opposite direction to that which is required to operate the cylinder and such as to return the piston to the non-operating condition of the cylinder unit.

The translation of the piston 28 towards the non-operating condition of the cylinder unit terminates when the piston is brought into abutment with the inner annular wall 46 of the switch 40.

The inner annular wall 46 of the switch 40 forms abutment means for the piston in the rest condition of the cylinder unit 1.

In a first embodiment of the cylinder unit according to the invention, the electrical circuit is normally open (FIGS. 1a to 1c and 2a to 2c).

Figure 2A:
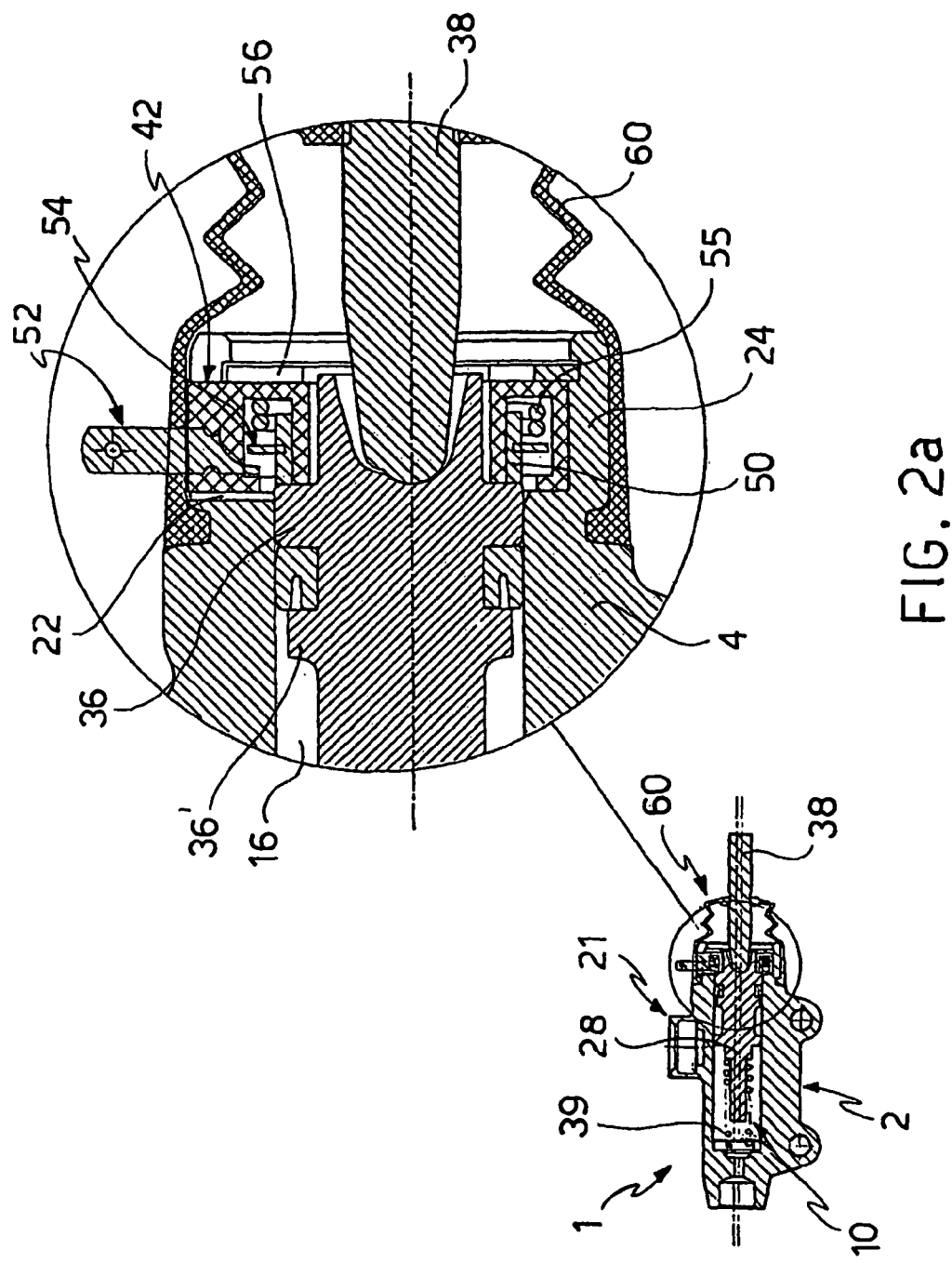
FIG. 2a is a cross-section through a master cylinder unit provided with a switch according to a further variant.

In this embodiment, in a configuration of the switch in which signalling is not active, the piston 28 is in a retracted position in which the working fluid is not under pressure and the first electrical contact 52 is not in contact with the second electrical contact 54 (FIGS. 1a and 2a).

In this configuration of the switch in which signalling is not active, the electrical circuit is open and no signal, for example, indicating braking, is activated.

In an operating configuration of the cylinder unit, the piston 28 is in an advanced position in which the working fluid is under pressure.

As a result of an adequate translation of the piston 28, the switch is brought to an active signalling configuration in which the second electrical contact 54 comes into contact with the first electrical contact 52 since the spring 55 constantly acts on the movable element 50 which carries the second electrical contact 54.

In this active signalling configuration of the switch, the electrical circuit is closed and a signal, for example, indicating braking, is activated.

In a further embodiment of the cylinder unit according to the invention, the electrical circuit is normally closed (FIGS. 3a to 3c and 4a to 4c).

Figure 3A:
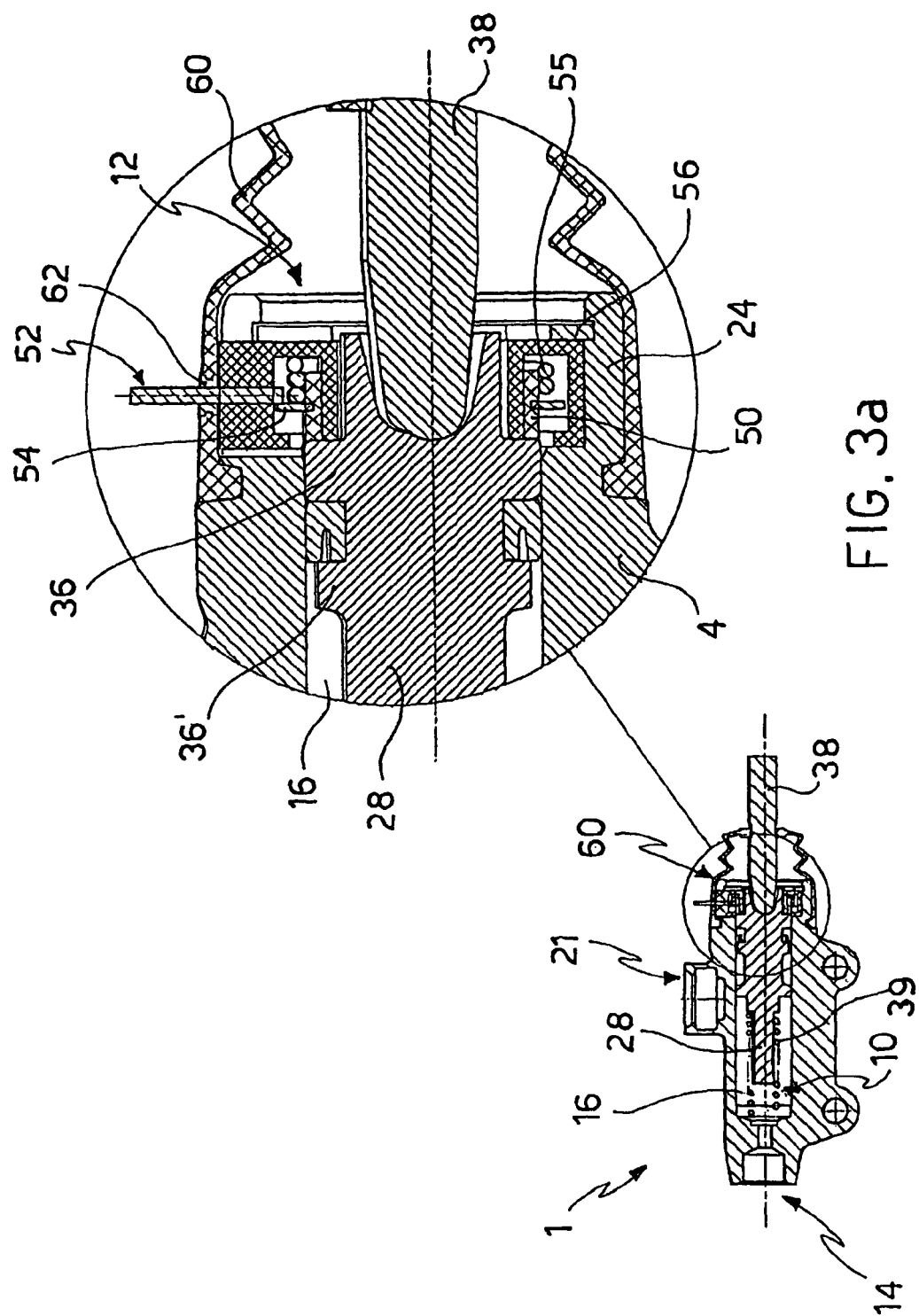
FIG. 3a is a cross-section through a master cylinder unit provided with a switch according to a further variant.
Figure 4A:
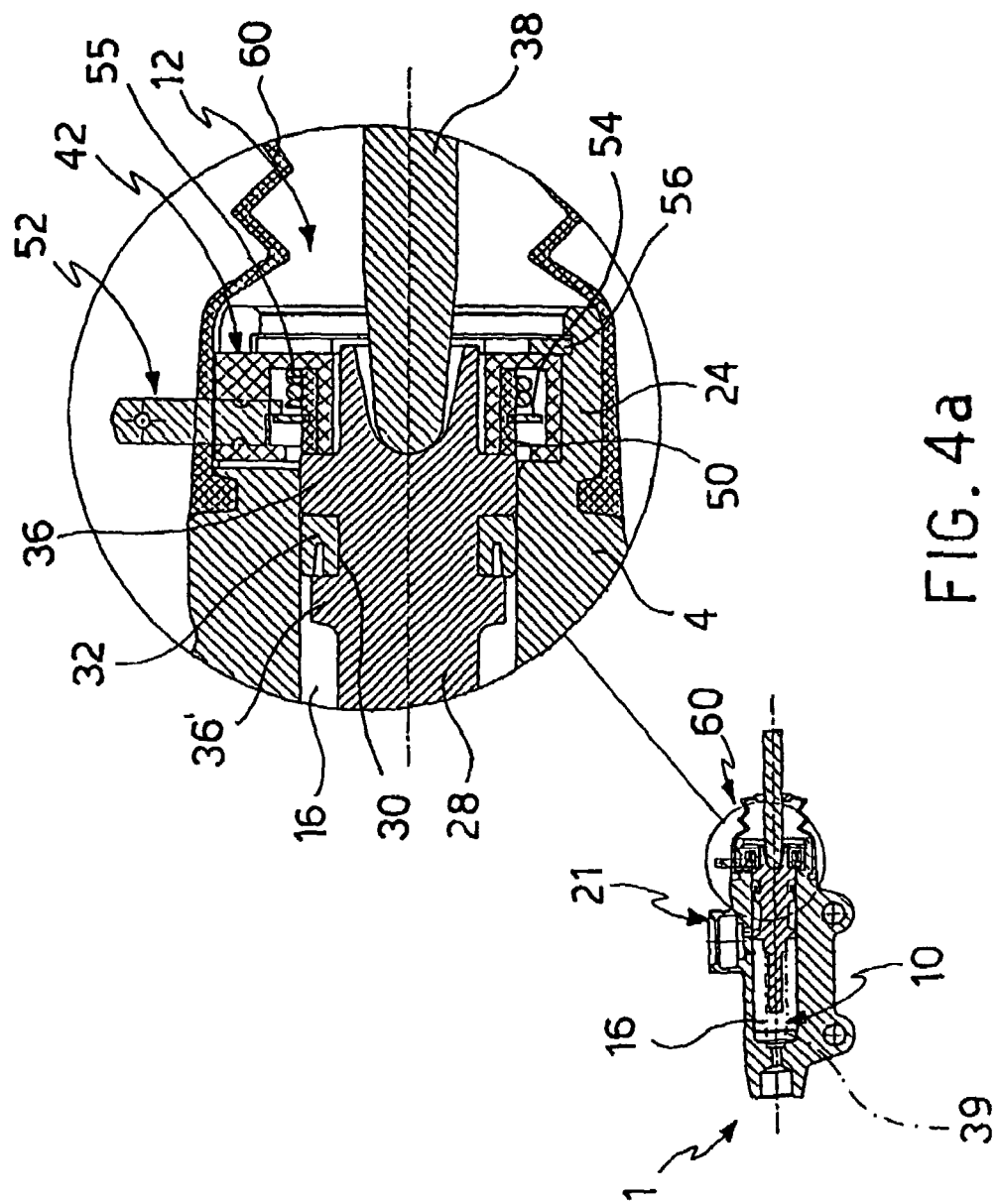
FIG. 4a is a cross-section through a master cylinder unit provided with a switch according to a further variant.

In this embodiment, in a configuration of the switch in which signalling is not active, the piston 28 is in a retracted position in which the working fluid is not under pressure and the first electrical contact 52 is in contact with the second electrical contact 54 (FIGS. 3a and 4a).

In this configuration of the switch in which signalling is not active, the electrical circuit is closed and no signal, for example, indicating braking, is activated.

The electrical circuit is used in the normally-closed configuration, for example, to test the correct operation of the signalling apparatus.

In an operating configuration of the cylinder unit, the piston 28 is in an advanced position in which the working fluid is under pressure.

As a direct consequence of this translation, the switch is brought to an active signalling configuration in which the first electrical contact 52 is not in contact with the second electrical contact 54 since the spring 55 acts constantly on the movable element 54 which carries the second electrical contact 54.

In this active signalling configuration of the switch, the electrical circuit is open and a signal, for example, indicating braking, is activated.

In a further embodiment of the cylinder unit according to the invention, the electrical circuit is normally closed and the second electrical contact 54 is slidable on the movable element 50 (FIG. 5).

In this embodiment, in a configuration of the switch in which signalling is not active, the piston 28 is in a retracted position in abutment with the inner annular wall 46 of the casing 42, the contact spring 54c is under compression, and the second electrical contact 54 is in contact with the first electrical contact 52.

In this configuration of the switch in which signalling is not active, the electrical circuit is closed and no signal, for example, indicating braking, is activated.

In an operating configuration of the cylinder unit, the piston 28 is in an advanced position in which the working fluid is under pressure.

As a result of this translation, the switch is brought to an active signalling configuration in which the first electrical contact 52 is not in contact with the second electrical contact 54 since the spring keeps the movable element 50 in abutment with the shoulder 36 of the piston 28 and, when the annular housing projection 50a has taken up any clearance travel, it acts on the second electrical contact 54, detaching it from the first electrical contact 52.

In this active signalling configuration of the switch, the electrical circuit is open and a signal, for example, indicating braking, is activated.

Unusually, the switch according to the present invention is easy to mount in the cylinder body, forming a cylinder unit which is economically advantageous during assembly and reliable in use.

In particular, the switch is in the form of a separate switch box provided both with the stationary electrical contacts and with the movable electrical contacts.

The switch, which is produced separately, is advantageously easily assembled with the cylinder body since it is housed in a seat of the cylinder body provided in the region of a free end thereof.

According to a further advantageous aspect, the switch can be replaced easily, for example, due to malfunctioning, without the need for lengthy replacement operations which involve sensitive parts of the cylinder unit.

According to yet another advantageous aspect, the switch is fitted in the compartment of the cylinder body with a form fit, whereas it has a radial clearance relative to the piston portion with which the push-rod cooperates and on which the cylinder unit is fitted in the assembled configuration.

According to a further advantageous aspect, the stationary contacts and the movable contacts come into contact with one another from a configuration in which they are spaced part, or are moved apart from a position in which they are in contact, without sliding taking place between them.

It is in fact known that repeated and frequent uses of contacts which slide relative to one another give rise to wear of the parts that are in contact. This characteristic is more evident the more frequently the contacts are used, as in the case of a master cylinder intended for a brake or a clutch.

Naturally, in order to satisfy contingent and specific requirements, a person skilled in the art will be able to apply many modifications and variations to the above-described switch and master cylinder unit.

According to a variant, the switch has a plurality of axially spaced-apart, stationary electrical contacts and a movable contact that slides relative to the stationary contacts so as to send signals having different purposes according to the position of the push-rod of the master cylinder.

Naturally, this variant is also intended to be included within the scope of protection of the invention as defined by the appended claims.

It should be noted that the description given above refers to a switch which can be associated with a master cylinder unit but the switch according to the invention, provided with the above-mentioned characteristics, can be associated with any device.

In particular, the switch 40 can be associated with a device, the switch being intended to open and/or to close at least one electrical circuit, and wherein the device comprises:

a device body 2 provided with a compartment 22 for the switch, a slidable element 28, the slidable element having a coupling portion 36 for cooperating with the switch 40, and the switch comprising:

a casing 42 suitable for being housed in the compartment of the device body 2, a first electrical contact 52 fixed firmly to the casing 42,
a movable element 50 suitable for being fixed firmly to the coupling portion 36 of the slidable element 28, and
a second electrical contact 54 associated with the movable element 50 of the switch 40 and suitable for cooperating with the first contact 52 of the casing 42 in order to open and/or to close the electrical circuit,
wherein the movable element 50 is at least partially housed in the casing 42 so as to form a separate switch box which can be associated with the device body 2 in the compartment 22 suitable for housing the switch 40.

The invention claimed is:

1. A switch which can be associated with a device, the switch being intended to open and/or to close at least one electrical circuit, wherein the device comprises:
a device body provided with a compartment for the switch,
a slidable element, the slidable element having a coupling portion for cooperating with the switch,
the switch comprising:
a casing suitable for being housed in the compartment of the device body,
a first electrical contact fixed firmly to the casing,
a movable element suitable for being fixed firmly to the coupling portion of the slidable element, and
a second electrical contact associated with the movable element of the switch and suitable for cooperating with the first contact of the casing in order to open/or close the electrical circuit, wherein the movable element is at least partially housed in the casing so as to form a separate switch box which can be associated with the device body in the compartment suitable for housing the switch and wherein the casing comprises means for the guiding and insertion of the switch in the compartment, in which the guiding and insertion means comprise a radial projection of an outer annular wall of the casing, in which the radial projection is suitable for being housed in an axial notch of the compartment.

2. A switch according to claim 1 in which the guiding and insertion means comprise an outer annular wall of the casing.

3. A switch according to claim 1 in which the switch comprises means for guiding the movable element.

4. A switch according to claim 3 in which the guiding means comprise an inner annular wall of the casing.

5. A switch according to claim 1 in which the movable element is a ring housed slidably in the casing.

6. A switch according to claim 1 in which the first electrical contact comprises at least a pair of portions of electrically-conductive wire.

7. A switch according to claim 1 in which the first electrical contact comprises at least a pair of Faston terminals.

8. A switch according to claim 1 in which the first electrical contact is at least partially incorporated in the casing of the switch.

9. A switch according to claim 1 in which the second electrical contact comprises a ring-shaped element or washer suitable for cooperating with the first electrical contact in order to open and/or to close the electrical circuit.

10. A switch according to claim 1 in which the second electrical contact is at least partially incorporated in the second movable element.

11. A switch according to claim 1 in which the second electrical contact is coupled slidably with the movable element.

12. A switch according to claim 11 in which the second electrical contact is constantly acted on by contact means.

13. A switch according to claim 12 in which the second electrical contact is constantly acted on by a contact spring fixed firmly to the movable element.

14. A switch according to claim 11 in which the movable element provides an annular retaining projection for the second slidable electrical contact.

15. A switch according to claim 1, further comprising resilient means suitable for constantly acting on the movable element.

16. A switch according to claim 15 in which the resilient means comprise a spring suitable for being housed in the casing of the switch.

17. A switch according to claim 15 in which the resilient means constantly act on the movable element whilst remaining in a state of compression between the movable element and a stop wall of the casing.

18. A switch according to claim 1 in which, in a rest configuration of the device, the first electrical contact and the second electrical contact are not in contact so that the electrical circuit is open.

19. A switch according to claim 1 in which, in a rest configuration of the device, the first electrical contact and the second electrical contact are in contact so that the electrical circuit is closed.

20. A switch according to claim 1 comprising abutment means for the slidable element of the device.

21. A switch according to claim 20 abutment means comprise an inner annular wall of the casing of the switch.

22. A device comprising a switch according to claim 1.

23. A master cylinder unit comprising a switch according to claim 1.

24. A switch which can be associated with a master cylinder unit in order to open and/or to close at least one electrical circuit, wherein the master cylinder unit comprises:
a cylinder body provided with a compartment for the switch and a seat in which a slidable piston can be housed, the piston having a coupling portion for cooperating with the switch, the switch comprising:
a casing suitable for being housed in the compartment of the cylinder body,
a first electrical contact fixed firmly to the casing and extending at least partially outside the cylinder body,
a movable element suitable for being fixed firmly to the coupling portion of the piston, and
a second electrical contact associated with the movable element and suitable for cooperating with the first contact of the casing in order to open and/or to close the electrical circuit,
wherein the movable element is at least partially contained in the casing so as to form a separate switch box which can be associated with the cylinder body in the compartment suitable for housing the switch.

25. A switch according to claim 24 in which the casing comprises means for the guiding and insertion of the switch in the compartment.

26. A switch according to claim 25 in which the guiding and insertion means comprise an outer annular wall of the casing.

27. A switch according to claim 25 in which the guiding and insertion means comprise a radial projection of an outer annular wall of the casing.

28. A switch according to claim 27 in which the radial projection is suitable for being housed in an axial notch of the compartment.

29. A switch according to claim 24 in which the switch comprises means for guiding the movable element.

30. A switch according to claim 29 in which the guiding means comprise an inner annular wall of the casing.

31. A switch according to claim 24 in which the movable element is a ring housed slidably in the casing.

32. A switch according to claim 24 in which the first electrical contact comprises at least a pair of portions of electrically-conductive wire.

33. A switch according to claim 24 in which the first electrical contact comprises at least a pair of Faston terminals.

34. A switch according to claim 24 in which the first electrical contact is at least partially incorporated in the casing of the switch.

35. A switch according to claim 24 in which the second electrical contact comprises at least one ring-shaped element or washer suitable for cooperating with the first electrical contact in order to open and/or to close the electrical circuit.

36. A switch according to claim 24 in which the second electrical contact is at least partially incorporated in the movable element.

37. A switch according to claim 24 in which the second electrical contact is coupled slidably with the movable element.

38. A switch according to claim 37 in which the second electrical contact is constantly acted on by contact means.

39. A switch according to claim 38 in which the second electrical contact is constantly acted on by a contact spring fixed firmly to the movable element.

40. A switch according to claim 37 in which the movable element provides an annular retaining projection for the second slidable electrical contact.

41. A switch according to claim 24 further comprising resilient means suitable for constantly acting on the movable element.

42. A switch according to claim 41 in which the resilient means comprise a spring suitable for being housed in the casing of the switch.

43. A switch according to claim 41 in which the resilient means act constantly on the movable element whilst remaining in a state of compression between the movable element and a stop wall of the casing.

44. A switch according to claim 24 in which, in a rest configuration of the master cylinder unit, the first electrical contact and the second electrical contact are not in contact so that the electrical circuit is open.

45. A switch according to claim 24 in which, in a rest configuration of the master cylinder unit, the first electrical contact and the second electrical contact are in contact so that the electrical circuit is closed.

46. A switch according to claim 24, comprising abutment means for the piston of the master cylinder unit.

47. A switch according to claim 46 in which the abutment means comprise an inner annular wall of the casing of the switch.

48. A master cylinder unit comprising a switch according to claim 24.

49. A brake comprising a master cylinder unit according to claim 48.

50. A disc brake comprising a master cylinder unit according to claim 48.

51. A clutch unit comprising a master cylinder unit according to claim 48.

52. A master cylinder unit comprising:
a cylinder body provided with a seat for housing a piston slidable in a leaktight manner,
a push-rod connected to the piston for operating the master cylinder unit,
a switch for opening and/or closing at least one electrical circuit associated with the master cylinder unit as a result of the operation of the master cylinder unit,
wherein the switch comprises:
a casing suitable for being housed in a compartment of the cylinder body, the casing being provided with a first electrical contact which extends at least partially outside the cylinder body,
a movable element fixed firmly to a coupling portion of the piston, the movable element being associated with a second electrical contact suitable for cooperating with the first contact of the casing in order to open and/or to close the electrical circuit,
wherein the movable element of the switch is at least partially housed in the casing of the switch so as to form a separate switch box associated with the cylinder body in a compartment provided therein.

53. A master cylinder unit according to claim 52, comprising means for the guiding and insertion of the switch in the compartment of the cylinder body.

54. A master cylinder unit according to claim 53 in which the guiding and insertion means comprise an axial notch in a compartment wall suitable for housing a radial projection of the switch.

55. A master cylinder unit according to claim 52 in which the push-rod is coupled directly with the piston.

56. A master cylinder unit according to claim 52 in which, in an assembled configuration, the switch is housed in the compartment with a form fit and has radial clearance relative to the end portion of the piston that is engaged by the push-rod.

57. A master cylinder unit according to claim 52, further comprising sealing means between the piston and the seat which houses it.

58. A master cylinder unit according to claim 52, further comprising means for fixing the switch firmly to the cylinder body, the fixing means being suitable for uniting the switch with the cylinder body.

59. A master cylinder unit according to claim 58 in which the fixing means comprise a split ring suitable for being inserted in a ring seat provided in the compartment.

60. A master cylinder unit according to claim 52, further comprising a protective boot fixed firmly to the cylinder body.

61. A master cylinder unit according to claim 60 in which the protective boot protects the master cylinder unit in the region of the end of the piston that is coupled with the push-rod.

62. A brake unit comprising a master cylinder unit according to claim 52.

63. A disc-brake unit comprising a master cylinder unit according to claim 52.

64. A clutch unit comprising a master cylinder unit according to claim 52.

65. A switch which can be associated with a device, the switch being intended to open and/or to close at least one electrical circuit, wherein the device comprises:
a device body provided with a compartment for the switch,
a slidable element, the slidable element having a coupling portion for cooperating with the switch,
the switch comprising:
a casing suitable for being housed in the compartment of the device body,
a first electrical contact fixed firmly to the casing, a movable element suitable for being fixed firmly to the coupling portion of the slidable element, and a second electrical contact associated with the movable element of the switch and suitable for cooperating with the first contact of the casing in order to open/or close the electrical circuit, wherein the movable element is at least partially housed in the casing so as to form a separate switch box which can be associated with the device body in the compartment suitable for housing the switch, and wherein the second electrical contact is coupled slidably with the movable element.

66. A switch according to claim 65 in which the second electrical contact is constantly acted on by contact means.

67. A switch according to claim 66 in which the second electrical contact is constantly acted on by a contact spring fixed firmly to the movable element.

68. A switch according to claim 65 in which the movable element provides an annular retaining projection for the second slidable electrical contact.

* * * * *